(No Model.) 2 Sheets—Sheet 1.
J. F. C. FARQUHAR & W. OLDHAM.
Filtering Liquids and Apparatus Therefor.
No. 243,233. Patented June 21, 1881.
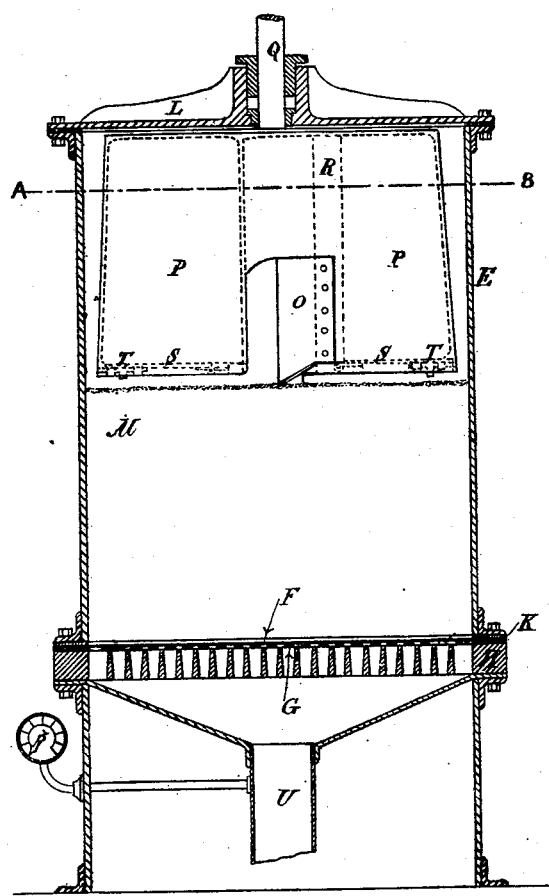
Fig. 1.
Fig. 3.
Section on line C.D.
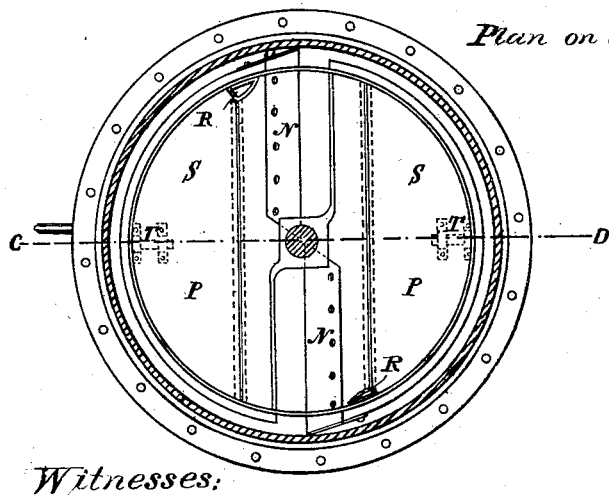
Fig. 2.
Plan on line A.B.
Witnesses:
Inventors.
John F. C. Farquhar
Walter Oldham.
By their Attorneys (No Model.) 2 Sheets—Sheet 2.
J. F. C. FARQUHAR & W. OLDHAM.
Filtering Liquids and Apparatus Therefor.
No. 243,233. Patented June 21, 1881.
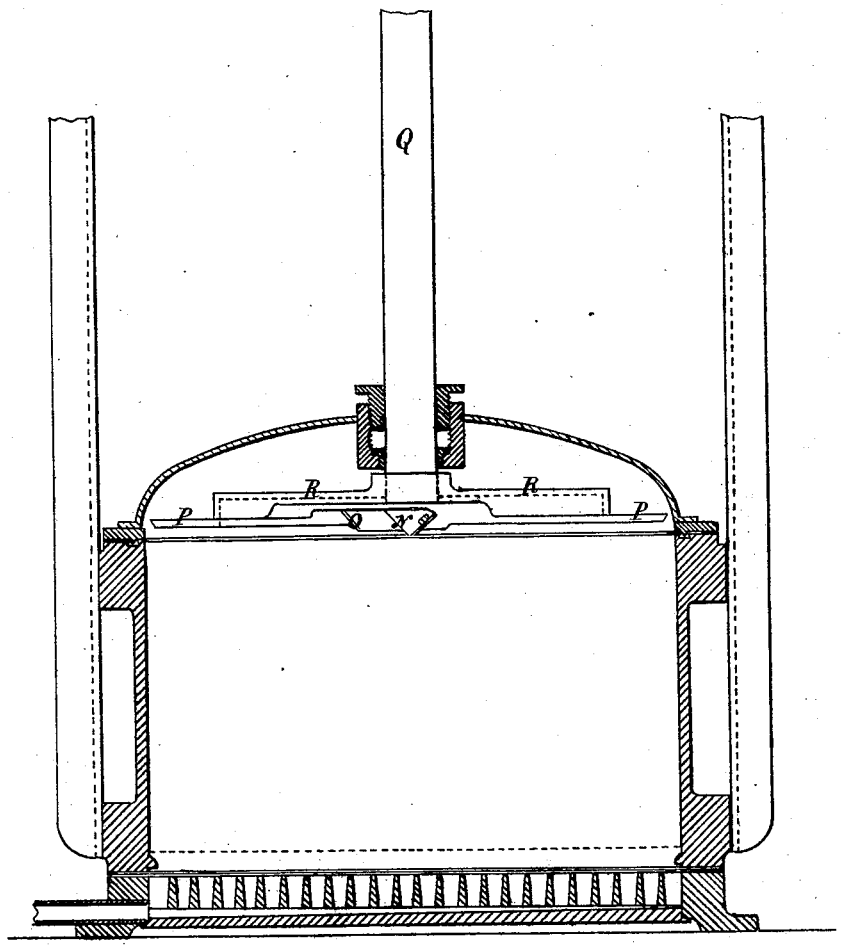
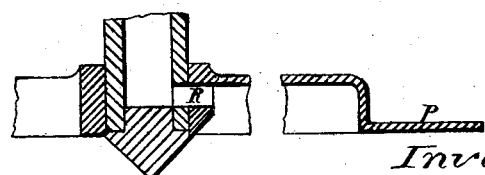

UNITED STATES PATENT OFFICE.

JOHN F. C. FARQUHAR, OF 24 AND 25 LONG ACRE, COUNTY OF MIDDLESEX, AND WALTER OLDHAM, OF ALLERTON LODGE, CAVENDISH ROAD, BALHAM, COUNTY OF SURREY, ENGLAND; SAID OLDHAM ASSIGNOR TO SAID FARQUHAR.

FILTERING LIQUIDS AND APPARATUS THEREFOR.

SPECIFICATION forming part of Letters Patent No. 243,233, dated June 21, 1881.

Application filed February 24, 1881. (No model.) Patented in England March 17, 1879.

*To all whom it may concern:*

Be it known that we, JOHN FREDERICK COOKE FARQUHAR and WALTER OLDHAM, subjects of the Queen of Great Britain, residing, respectively, at Nos. 24 and 25 Long Acre, in the county of Middlesex, and Allerton Lodge, Cavendish Road, Balham, in the county of Surrey, both in England, have invented certain new and useful Improvements in Filtering Liquids and in Apparatus to be Used for this Purpose, (for which we have received Letters Patent in England, No. 1,051, dated 17th March, 1879,) of which the following is a specification.

According to this invention a filtering apparatus is constructed with a filtering-bed of sand, sawdust, or other filtering material in a granular form, and means for carrying out our improvement in the art or method of filtering are provided, by which, during the time the liquid is filtering through such granular bed, the surface of the bed may be scraped continuously or intermittently, so that a clean surface is always presented for the liquid to enter the bed and filter through it.

The system of filtration through a granular filter-bed the surface of which is kept free from slimy or other deposit by scraping during the time filtration is going on may be applied to filtration with centrifugal machines.

The drawings hereunto annexed show various views of apparatus for carrying out the invention.

Figure 1 is a vertical section, and Fig. 2 is a plan view, of one form of the apparatus.

E is a circular vessel, having solid sides and open at top and bottom. The bottom, to which it is attached, is composed of a cloth or felt, F, stretched over a perforated plate, G, which plate bears upon the grating H. An elastic ring, K, is interposed between the vessel E and the cloth F, for the purpose of making a tight joint.

L is the top cover. It can be secured by means of bolts and nuts, or other means may be adopted for enabling the cover to be quickly removed and replaced and a tight joint secured.

M is the granular filtering bed or medium, preferably powdered glass, sand, or sawdust. The liquid to be filtered can be forced into the vessel E through a pipe entering the vessel at any suitable position above the filtering medium.

N N are two scrapers for removing the solid or slimy deposit as it accumulates on the top surface of the filtering medium during the process of filtration. Each scraper is carried at the bottom of the box or receptacle P, which is to receive the matters scraped up by the scraper. The boxes may be separate one from the other, or one common box or receptacle might be used. A single scraper or more scrapers might also be employed.

O O are side guard-plates, placed at the outer extremities of the scrapers to insure that the matters raised by the scrapers shall pass into the interior of the boxes. The deposit-receiving box or boxes, with the scrapers, are carried by a spindle, Q, and are caused to revolve at any speed required by means of pulleys or wheels attached to the spindle Q. They are also at the same time caused to descend at any speed required by means of a rack and pinion or screw or other suitable arrangements acting on the spindle Q. The speeds of the revolving and descending motions of the box-scraper are determined by the amount of deposit required to be removed from off the top surface of the filtering-bed in a certain time. In removing this deposit a small portion of the filtering medium is taken up at the same time; but the quantity so taken up should bear the smallest possible proportion to the amount of the actual deposit, and this can be governed by regulating the revolving and descending motions of the box-scraper. In some cases, also, the scraper might be made to remove the deposit only, and not to take up any of the granular filtering medium.

It is advisable to allow the liquor to be filtered to be brought into contact with the filtering medium as closely behind the blades of the knives as possible, and for this purpose suitable channels are constructed, as shown at R R, to convey the liquor to behind the knives. These channels can be multiplied, if found necessary.

When the box-scraper has filled itself with the deposit and has descended to within a certain distance of the bottom of the filtering medium the machinery for driving the same becomes disconnected. The cover L is then removed and the box-scraper is raised out of the vessel E for the purpose of being cleansed.

The bottom of the box-scraper is fitted with two or more hinged doors, S S, held closed by sliding bolts T, as shown. When the box-scraper has been raised out of the vessel E the bolts T T are driven back and the doors open downward on their hinges, and the deposit falls out into a suitable vessel. If desired, the filtering medium can then be easily freed from the deposit by washing or agitating the same in a vessel filled with water or other cleansing-fluid.

Previous to filtration the filtering medium should be thoroughly saturated with the clear liquid of the liquor to be filtered, and no part of the filtering medium should be allowed to get dry; otherwise the area for filtration will be diminished accordingly. To obviate this, and also to prevent the medium from packing together too closely at the bottom when under pressure, the under side of the grating H may be surrounded with a conical vessel leading into a delivery-pipe, U. A pressure-gage or a weighted valve might be attached to this pipe, and the discharge through the pipe U regulated by means of a cock or valve, so that a certain amount of pressure of liquor shall be kept back in the filtering medium.

Fig. 4 shows a section of apparatus somewhat modified from that shown at Figs. 1, 2, and 3. In this modification the box-receptacle for the matters scraped up by the scraper is dispensed with, and the scraper or scrapers are simply carried by a slotted disk carried by the lower end of the spindle Q. The spindle Q also is made hollow, and the liquid to be filtered is conducted through it into the filter. The liquid passes from the lower end of the spindle into radial channels on the disk, and the disk is slotted on the under side of these channels, so that the liquid passes onto the filtering material just below the disk, and therefore just where a clean filter-surface is produced by the action of the scraper.

In Fig. 4, Q is the hollow spindle; P, a disk on the bottom of this spindle; N, a scraper carried by one side of a radial slot in the disk P. O is a guard-plate to prevent the surface of the filter-bed as it is cut off by the scraper from going under the disk P. R R are radial channels, by which the liquid to be filtered is led from the hollow spindle onto the clean filter-surface obtained by the action of the scraper. One of these channels leading out from the hollow axis is shown in section at Fig. 5. The filtering-chamber is formed for the most part in the way described with reference to Fig. 1, so that it is unnecessary again to describe it.

Any convenient arrangement may be adopted for slowly rotating the hollow spindle and for at the same time lowering it little by little. As it descends the dirtied filtering material which the scraper has scraped up will be above the disk P, resting upon it as a receptacle and out of action, while the filtering material below the disk will always have a clean surface, which will allow the liquid to be filtered to enter and pass through the bed of filtering material. When the disk has arrived nearly at the bottom of the filter-bed the filtering operation has to be arrested automatically. The cover of the filter-chamber is then lifted up, the disk is raised, and the dirtied filtering material conveyed away and clean filtering material substituted for it. The filtering-chamber can then be again closed and the filtering operation recommenced.

It is not necessary that the scraper should be made to revolve around a center. It may be moved over the surface of the filter-bed in any desired manner. For filtering impure water—as, for example, for water-works—it might be constructed after the manner of a road-scraper and be supported on wheels or rollers, with a receptacle behind the scraper to receive the deposit which is gathered up by the scraper, and such scraping apparatus might be dragged to and fro across the surface of the filtering-bed by means of ropes, &c., during the process of filtration, and the deposit discharged as often as found requisite; or the scraper and receptacle might be supported by wheels running on rails at the sides of a rectangular filter-bed, provision being made for slowly lowering the scraper as it is moved to and fro over the surface of the bed.

What is claimed is—

1. As an improvement in the art of uninterruptedly filtering liquids through a bed of granular filtering medium, the described method of keeping clean the surface of the filtering-bed during the filtering operation, or freeing it from slimy or solid matters as they are deposited thereon by the liquid undergoing treatment, which consists in repeatedly removing such matters from the bed's surface as they accumulate thereon or while the liquid is passing through the bed, and retaining them as removed or preventing them from again settling, whereby continuous and uniform filtration is facilitated, substantially as hereinbefore set forth.

2. The combination of the filtering-vessel and the scraper or scrapers revolving about a vertical axis, whereby the surface of a filtering-bed may be repeatedly operated upon while the liquid is passing through the bed, substantially as and for the purpose hereinbefore set forth.

3. The combination of the filtering-vessel, the revolving scraper or scrapers having the capacity of repeatedly operating upon the surface of a filtering-bed to remove deposit while liquid is passing through the bed, and the receptacle or receptacles in the filtering-vessel located over the filtering-bed, and into which to deliver such deposit as may be removed from the bed's surface by the scraper or scrapers, substantially as and for the purpose hereinbefore set forth.

4. The combination, with the granular filtering bed or medium, (or filtering-vessel provided with such bed,) of the scraper for removing deposit from the surface of the bed during filtration and collecting such deposit separately from the filtering-bed by delivering it into a receptacle above said bed, and the supply-pipe or conveying-channel by which the liquid to be treated is delivered upon the filtering-bed beneath the collected deposits, substantially as and for the purpose hereinbefore set forth.

J. F. C. FARQUHAR.
WALTER OLDHAM.

Witnesses:
  J. WATT,
  J. DEAN,
    *Both of* 17 *Gracechurch Street, London.*